US010458427B2

(12) United States Patent
McGill et al.

(10) Patent No.: US 10,458,427 B2
(45) Date of Patent: Oct. 29, 2019

(54) COMPRESSOR AEROFOIL

(71) Applicant: Siemens Aktiengesellschaft, Munich (DE)

(72) Inventors: John McGill, Ballymoney (GB); Robert Miller, Cambridge (GB); Roger Wells, Newark (GB)

(73) Assignee: Siemens Aktiengesellschaft, Munich (DE)

( * ) Notice: Subject to any disclaimer, the term of this patent is extended or adjusted under 35 U.S.C. 154(b) by 290 days.

(21) Appl. No.: 15/329,366

(22) PCT Filed: Aug. 17, 2015

(86) PCT No.: PCT/EP2015/068856
§ 371 (c)(1),
(2) Date: Jan. 26, 2017

(87) PCT Pub. No.: WO2016/026814
PCT Pub. Date: Feb. 25, 2016

(65) Prior Publication Data
US 2017/0218976 A1    Aug. 3, 2017

(30) Foreign Application Priority Data
Aug. 18, 2014 (EP) ..................... 14181280

(51) Int. Cl.
*F04D 29/38* (2006.01)
*F01D 5/20* (2006.01)
(Continued)

(52) U.S. Cl.
CPC ............. *F04D 29/384* (2013.01); *F01D 5/20* (2013.01); *F04D 29/164* (2013.01);
(Continued)

(58) Field of Classification Search
CPC . F01D 5/20; F01D 5/141; F01D 5/145; F05D 2240/303; F05D 2240/304; F05D 2240/307; F05D 2250/70
(Continued)

(56) References Cited

U.S. PATENT DOCUMENTS 5,282,721 A * 2/1994 Kildea .................... F01D 11/10
                                                        415/173.1
6,142,739 A * 11/2000 Harvey ..................... F01D 5/20
                                                        415/173.1
(Continued)

FOREIGN PATENT DOCUMENTS

CN       101131096 A     2/2008
DE    102012021400 A1    4/2014
(Continued)

OTHER PUBLICATIONS

International Search/Written Opinion Report dated Oct. 20, 2015, for PCT/EP2015/068856.
(Continued)

*Primary Examiner* — John M Zaleskas
(74) *Attorney, Agent, or Firm* — Beusse Wolter Sanks & Maire

(57) ABSTRACT

A compressor aerofoil for a turbine engine or an axial process compressor, the compressor aerofoil includes a suction surface wall having a suction surface and a pressure surface wall having a pressure surface, the suction surface wall and the pressure surface wall meet at a leading edge and a trailing edge and define a tip having a tip surface, the aerofoil has a maximum thickness $T_{max}$. A mean camber line is defined as passing through the leading edge and the trailing edge. The compressor aerofoil further includes a winglet at the tip and which extends from the suction surface, the winglet has an overhang W that has a perpendicular extent from the suction surface in the range $0.1 T_{max}$ (Continued)

to $1.5T_{max}$. The winglet has a maximum overhang $W_{max}$ that occurs within 50% of the length of the mean camber line from the leading edge.

19 Claims, 12 Drawing Sheets

(51) Int. Cl.
  *F04D 29/16* (2006.01)
  *F04D 29/32* (2006.01)
  *F04D 29/54* (2006.01)
  *F01D 5/14* (2006.01)

(52) U.S. Cl.
  CPC ......... *F04D 29/324* (2013.01); *F04D 29/388* (2013.01); *F04D 29/544* (2013.01); *F01D 5/145* (2013.01); *F05D 2240/303* (2013.01); *F05D 2240/306* (2013.01); *F05D 2240/307* (2013.01)

(58) Field of Classification Search
  USPC ...................................................... 416/223 R
  See application file for complete search history.

(56) References Cited

U.S. PATENT DOCUMENTS

| | | | |
|---|---|---|---|
| 6,283,705 B1 | 9/2001 | Rice et al. | |
| 6,565,324 B1 * | 5/2003 | Phillipsen | F01D 5/141 415/191 |
| 7,632,062 B2 | 12/2009 | Harvey et al. | |
| 8,414,265 B2 | 4/2013 | Willett, Jr. | |
| 2003/0170120 A1 * | 9/2003 | Grunke | F01D 5/20 415/174.4 |
| 2004/0091361 A1 * | 5/2004 | Wadia | F01D 5/145 416/236 R |
| 2005/0036890 A1 * | 2/2005 | Tomberg | F01D 5/147 416/192 |
| 2005/0169758 A1 * | 8/2005 | Dube | F01D 5/143 416/191 |
| 2005/0169761 A1 * | 8/2005 | Dube | F01D 5/143 416/223 R |
| 2005/0220627 A1 * | 10/2005 | Goodman | F01D 5/20 416/235 |
| 2005/0232771 A1 * | 10/2005 | Harvey | F01D 5/20 416/97 R |
| 2006/0182633 A1 * | 8/2006 | Harvey | F01D 5/141 416/223 R |
| 2008/0063520 A1 * | 3/2008 | Baumann | F01D 5/06 415/209.3 |
| 2008/0213098 A1 * | 9/2008 | Neef | F01D 5/20 416/223 A |
| 2009/0136347 A1 * | 5/2009 | Brittingham | F01D 5/147 416/179 |
| 2009/0214355 A1 * | 8/2009 | Pereti | B23P 6/002 416/97 R |
| 2010/0013813 A1 | 1/2010 | Katoh et al. | |
| 2010/0054955 A1 * | 3/2010 | Helvaci | F01D 5/187 416/97 R |
| 2010/0098554 A1 * | 4/2010 | Cheong | F01D 5/20 416/97 R |
| 2010/0221122 A1 * | 9/2010 | Klasing | F01D 5/20 416/97 R |
| 2011/0091327 A1 * | 4/2011 | Willett, Jr. | F01D 5/145 416/235 |
| 2011/0135482 A1 * | 6/2011 | Nash | F01D 5/141 416/223 A |
| 2011/0255985 A1 * | 10/2011 | Diamond | F01D 5/20 416/223 R |
| 2011/0255986 A1 * | 10/2011 | Diamond | F01D 5/20 416/223 R |
| 2011/0255990 A1 * | 10/2011 | Diamond | F01D 5/20 416/97 R |
| 2012/0100000 A1 * | 4/2012 | He | F01D 5/20 416/223 R |
| 2012/0269623 A1 * | 10/2012 | Milne | F01D 5/141 415/208.1 |
| 2013/0236319 A1 * | 9/2013 | Rockarts | F01D 5/141 416/223 R |
| 2014/0119942 A1 * | 5/2014 | Lehmann | F01D 5/20 416/241 R |
| 2014/0241899 A1 * | 8/2014 | Marini | F01D 5/20 416/236 R |
| 2014/0245753 A1 * | 9/2014 | Lamb, Jr. | F01D 5/14 60/805 |
| 2015/0071777 A1 * | 3/2015 | Willer | F01D 9/041 415/208.2 |
| 2015/0110617 A1 * | 4/2015 | Stein | F01D 5/141 415/208.1 |
| 2015/0159488 A1 * | 6/2015 | Lehmann | F01D 5/18 416/1 |

FOREIGN PATENT DOCUMENTS

| | | | | |
|---|---|---|---|---|
| EP | 1898052 A2 | 3/2008 | | |
| EP | 2093378 A1 | 8/2009 | | |
| EP | 2378076 A1 | 10/2011 | | |
| EP | 1898052 A2 | 7/2012 | | |
| EP | 2725195 A1 | 4/2014 | | |
| GB | 1491556 A | * | 11/1977 | ............... F01D 5/20 |
| WO | 2011072892 A1 | 6/2011 | | |

OTHER PUBLICATIONS

CN Office Action dated Jul. 31, 2017, for CN patent application No. 201580044308.9.

* cited by examiner

--- Original Blade Shape
— Winglet Blade Shape

Datum

PASSAGE  WAKE  PASSAGE
HUB

Winglet

HUB

COMPRESSOR AEROFOIL

CROSS REFERENCE TO RELATED APPLICATIONS

This application is the US National Stage of International Application No. PCT/EP2015/068856 filed Aug. 17, 2015, and claims the benefit thereof. The International Application claims the benefit of European Application No. EP14181280 filed Aug. 18, 2014. All of the applications are incorporated by reference herein in their entirety.

FIELD OF INVENTION

The present invention relates to a compressor aerofoil and in particular a configuration of a tip of the compressor aerofoil to minimise aerodynamic losses. The compressor aerofoil is either a rotor blade or a stator vane.

BACKGROUND OF INVENTION

A compressor of a gas turbine engine comprises rotor components, including rotor blades and a rotor drum, and stator components, including stator vanes and a stator casing. The compressor is arranged about a rotational axis with a number of alternating rotor blade and stator vane stages as is well known and each stage comprises an aerofoil. The efficiency of the compressor is influenced by the running clearances or radial tip gap between its rotor and stator components. The radial gap or clearance between the rotor blades and stator casing and between the stator vanes and the rotor drum is set to be as small as possible to minimise over tip leakage of working gases, but sufficiently large to avoid significant rubbing that can damage components.

The pressure difference between a pressure side and a suction side of the compressor aerofoil causes the air to leak through the tip gap. The over-tip leakage flow results in large amounts of loss and blockage in the tip gap region of the compressor stage and which is detrimental to the stability and efficiency of compressors.

In a gas turbine engine the compressor is driven by a turbine. Like a compressor the turbine comprises a number of alternating rotor blade and stator vane stages. Hot working gas from a combustor impinges on the turbine blades, which are mounted to a turbine rotor disc, and forces the rotor disc to rotate thereby driving the compressor. The compressor blades are forced to rotate and draw in air to the engine and compress it. Thus there is a fundamental difference between turbines and compressors, with turbines blades extracting energy from the hot working gases while compressors impart energy to the air stream. From the upstream side to the downstream side of each turbine blade stage the pressure of the working gas flow decreases as work is extracted from the working gas, whereas for a compressor stage the pressure increases across each stage as work is input to the air stream.

Reduction of over-tip leakage in turbines has been addressed in a number of blade tip configurations including winglets. Essentially, a winglet is an overhang extending from the tip of the turbine blade in a pitch-wise direction to overhang a pressure and/or suction surface of the blade. Turbine winglets are designed to reduce the pressure difference from the pressure side to the suction side and over the blade tip. This pressure difference over the blade tip will be referred to as tip loading. These turbine blade winglets are specifically designed to accommodate the drop in working gas pressure that occurs from the leading edge to the trailing edge of the blade. Examples of these turbine winglets include EP 2 093 378, US 2010/0135813, U.S. Pat. No. 7,632,062, 8,414,265 and US 2005/0232771. Turbine blade winglets can be designed to minimize heat transfer into the blade. In EP 2 725 195 A1 the winglet is designed to move an over-tip leakage vortex away from the suction surface of the blade thereby preventing additional hot gases impinging on and increasing the temperature of the blade material.

The present invention relates to the configuration of a winglet applicable only to compressor aerofoils. The impact of winglets on compressor aerofoils and turbines blades is fundamentally different in nature because the efficiency of compressors is limited by corner separations while for turbines winglets are designed to reduce tip loading and reducing heat transfer. The applicant has found that application of a turbine winglet to a compressor blade can actually reduce efficiency by increasing the size of or causing a corner separation near the aerofoil tip. Thus the present invention addresses not only a reduction of over-tip leakage mass flow, but importantly addresses separations unique to compressor aerofoils.

SUMMARY OF INVENTION

One objective of the present invention is to reduce over-tip leakage of a compressor aerofoil. Another objective is to minimise aerodynamic separations, particularly, at a downstream part of a compressor aerofoil. Another objective of the present invention is to reduction a pressure difference across a tip gap, for the same gap size. Another objective is to reduce blockage in an endwall region. Another objective is to improve compressor efficiency. An advantage of the present invention is reduction of over-tip leakage in a compressor where there is an increase in pressure across the compressor in a downstream direction and generally from a leading edge to a trailing edge of a compressor aerofoil.

For these and other objectives and advantages there is provided a compressor aerofoil comprises a suction surface wall having a suction surface and a pressure surface wall having a pressure surface, the suction surface wall and the pressure surface wall meet at a leading edge and a trailing edge and define a tip having a tip surface, the aerofoil has a maximum thickness $T_{max}$, a mean camber line is defined as passing through the leading edge and the trailing edge, the compressor aerofoil further comprises a winglet at the tip and which extends from the suction surface, the winglet has an overhang W that has a perpendicular extent from the suction surface in the range 0.1Tmax to 1.5Tmax, the winglet has a maximum overhang $W_{max}$ that occurs within 50% of the length of the mean camber line from the leading edge.

The winglet may have a leading portion and a trailing portion. The leading portion of the winglet is located at or towards the leading edge of the aerofoil. The trailing portion of the winglet is located at or towards the trailing edge of the aerofoil.

The leading portion of the winglet may have an overhang W in the range 0.2T to 1.5T.

The leading portion of the winglet may have a blend out portion which extends along the suction surface a distance in the range 5% to 40% of the mean camber line length and is located between the maximum overhang $W_{max}$ and the trailing portion.

The leading portion of the winglet may have a blend in portion which starts at any position within the range between the leading edge and up to 2% of the length of the mean camber line from the maximum overhang $W_{max}$.

The leading portion of the winglet may have a constant overhang which extends along the suction surface up to 65% of the length of the camber line.

The trailing edge portion of the winglet may have an overhang from the suction surface a distance −0.5T to 1T.

The suction surface may have a radial extent and the winglet may have a radial extent S, where S is in the range 1-15% of the radial extent of the suction surface. S may be approximately 1-3% of the radial extent of the suction surface.

The winglet may define a radially outer surface and which may be continuous with and forms part of the tip surface.

The winglet may comprise a suction rib extending along a suction surface edge of the winglet.

A width $W_{rib}$ of the suction rib may be in the range 5 to 75% of $T_{max}$ of the maximum thickness of the aerofoil.

A width $W_{rib}$ of the suction rib may be approximately 25% of the maximum thickness of the aerofoil $T_{max}$.

The winglet may comprise a pressure rib extending along a pressure surface edge of the winglet and the pressure rib and the suction rib define a leading gap and a trailing gap therebetween.

The rib height may be up to 4% of the length of the mean camber line from the remainder of the tip surface.

BRIEF DESCRIPTION OF THE DRAWINGS

The above mentioned attributes and other features and advantages of this invention and the manner of attaining them will become more apparent and the invention itself will be better understood by reference to the following description of embodiments of the invention taken in conjunction with the accompanying drawings, wherein.

DETAILED DESCRIPTION OF INVENTION

Figure 1:
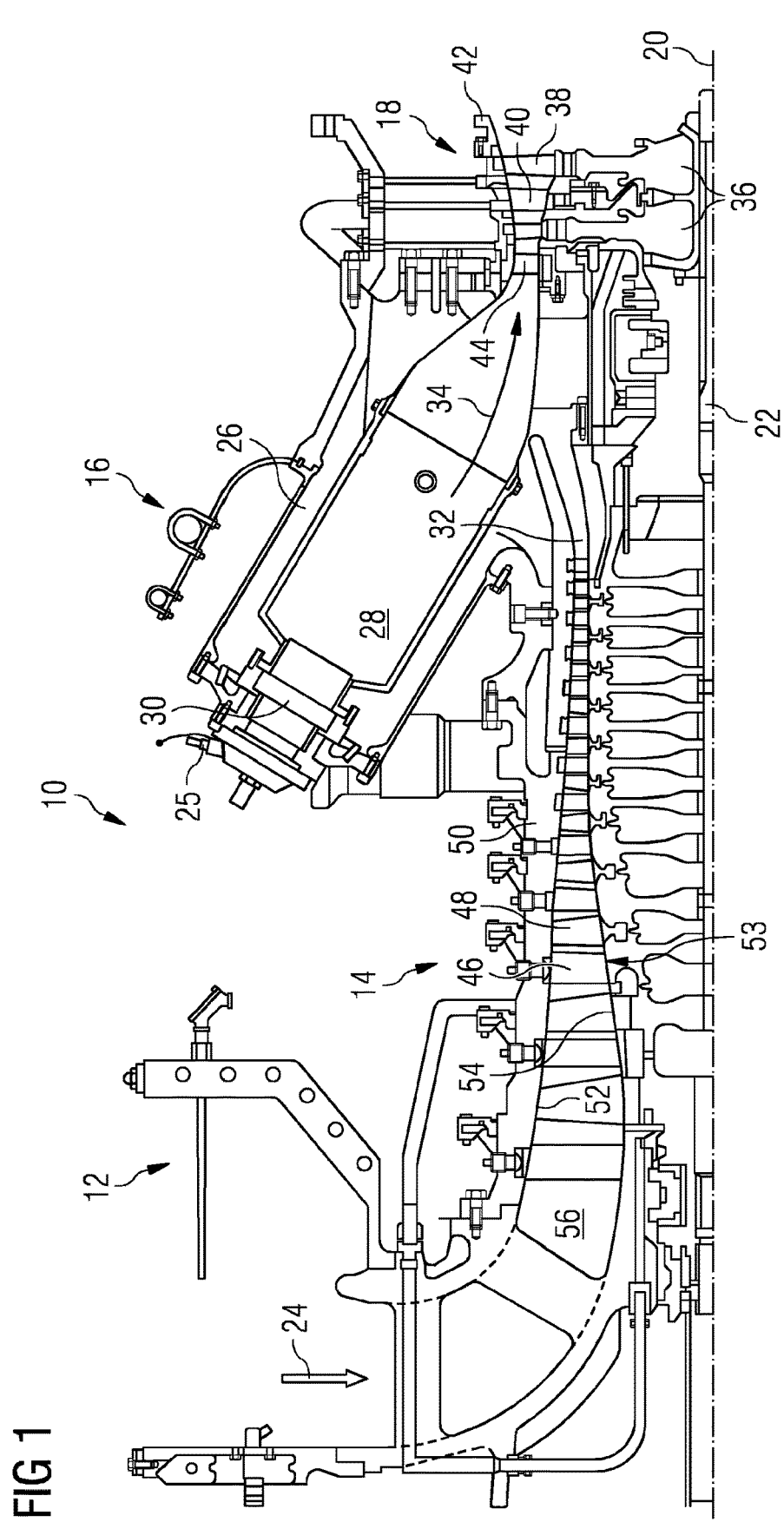
FIG. 1 shows part of a turbine engine in a sectional view and in which the present invention is incorporated, FIG. 2. shows an enlarged view of part of a compressor of the turbine engine and in which the present invention is incorporated.

FIG. 1 shows an example of a gas turbine engine 10 in a sectional view. The gas turbine engine 10 comprises, in flow series, an inlet 12, a compressor section 14, a combustor section 16 and a turbine section 18 which are generally arranged in flow series and generally about and in the direction of a longitudinal or rotational axis 20. The gas turbine engine 10 further comprises a shaft 22 which is rotatable about the rotational axis 20 and which extends longitudinally through the gas turbine engine 10. The shaft 22 drivingly connects the turbine section 18 to the compressor section 14.

In operation of the gas turbine engine 10, air 24, which is taken in through the air inlet 12 is compressed by the compressor section 14 and delivered to the combustion section or burner section 16. The burner section 16 comprises a burner plenum 26, one or more combustion chambers 28 and at least one burner 30 fixed to each combustion chamber 28. The combustion chambers 28 and the burners 30 are located inside the burner plenum 26. The compressed air passing through the compressor 14 enters a diffuser 32 and is discharged from the diffuser 32 into the burner plenum 26 from where a portion of the air enters the burner 30 and is mixed with a gaseous or liquid fuel. The air/fuel mixture is then burned and the resulting combustion gas 34 or working gas from the combustion is channeled through the combustion chamber 28 to the turbine section 18.

The turbine section 18 comprises a number of blade carrying discs 36 attached to the shaft 22. In the present example, two discs 36 each carry an annular array of turbine blades 38. However, the number of blade carrying discs could be different, i.e. only one disc or more than two discs. In addition, guiding vanes 40, which are fixed to a stator 42 of the gas turbine engine 10, are disposed between the stages of annular arrays of turbine blades 38. Between the exit of the combustion chamber 28 and the leading turbine blades 38, inlet guiding vanes 44 are provided and turn the flow of working gas onto the turbine blades 38.

The combustion gas from the combustion chamber 28 enters the turbine section 18 and drives the turbine blades 38 which in turn rotate the shaft 22. The guiding vanes 40, 44 serve to optimise the angle of the combustion or working gas on the turbine blades 38.

The turbine section 18 drives the compressor section 14. The compressor section 14 comprises an axial series of vane stages 46 and rotor blade stages 48. The rotor blade stages 48 comprise a rotor disc supporting an annular array of blades. The compressor section 14 also comprises a casing 50 that surrounds the rotor stages and supports the vane stages 48. The guide vane stages include an annular array of radially extending vanes that are mounted to the casing 50. The vanes are provided to present gas flow at an optimal angle for the blades at a given engine operational point. Some of the guide vane stages have variable vanes, where the angle of the vanes, about their own longitudinal axis, can be adjusted for angle according to air flow characteristics that can occur at different engine operations conditions.

The casing 50 defines a radially outer surface 52 of the passage 56 of the compressor 14. A radially inner surface 54 of the passage 56 is at least partly defined by a rotor drum 53 of the rotor which is partly defined by the annular array of blades 48 and will be described in more detail below.

In operation, air is drawn into the inlet and through the compressor 14. Across each stage of the compressor the air is compressed further. Therefore, as the air passes through each stage the air increases in pressure and in particular there is an increase in pressure from the leading edge to the trailing edge of each aerofoil of the compressor. It should be noted that for the turbine, as the working gas from the combustor impinges on and drives the turbine, energy is extracted from the working gas. This energy extraction means that across each stage of the turbine and particularly the rotor stages the pressure of the working gas decreases. Thus there is a fundamental difference between turbines and compressors, with turbines blades extracting energy from the hot working gases while compressors impart energy to the air stream. These different pressure regimes create different flow characteristic around each of the different compressor and turbine aerofoils of the compressor and turbine and in particular the fluid flow characteristics around and over the aerofoil tips.

The present invention is described with reference to the above exemplary turbine engine having a single shaft or spool connecting a single, multi-stage compressor and a single, one or more stage turbine. However, it should be appreciated that the present invention is equally applicable to two or three shaft engines and which can be used for industrial, aero or marine applications. The term rotor or rotor assembly is intended to include rotating components, including rotor blades and a rotor drum. The term stator or stator assembly is intended to include stationary or non-rotating components, including stator vanes and a stator casing. Thus the term rotor-to-stator is intended to relate a rotating component, to a stationary component such as a rotating blade and stationary casing or a rotating casing and a stationary blade or vane. The rotating component can be radially inward or radially outward of the stationary component. The term aerofoil is intended to mean the aerofoil portion of a rotating blade or stationary vane.

The terms upstream and downstream refer to the flow direction of the airflow and/or working gas flow through the engine unless otherwise stated. The terms forward and rearward refer to the general flow of gas through the engine. The terms axial, radial and circumferential are made with reference to the rotational axis 20 of the engine.

The present invention is also applicable to any gas turbine having water injected into the inlet 12. The water can be in the form of liquid or steam. Therefore the air flow 24 may also contain water. However, the term air will be used throughout to describe both air only and air containing water.

Figure 2:
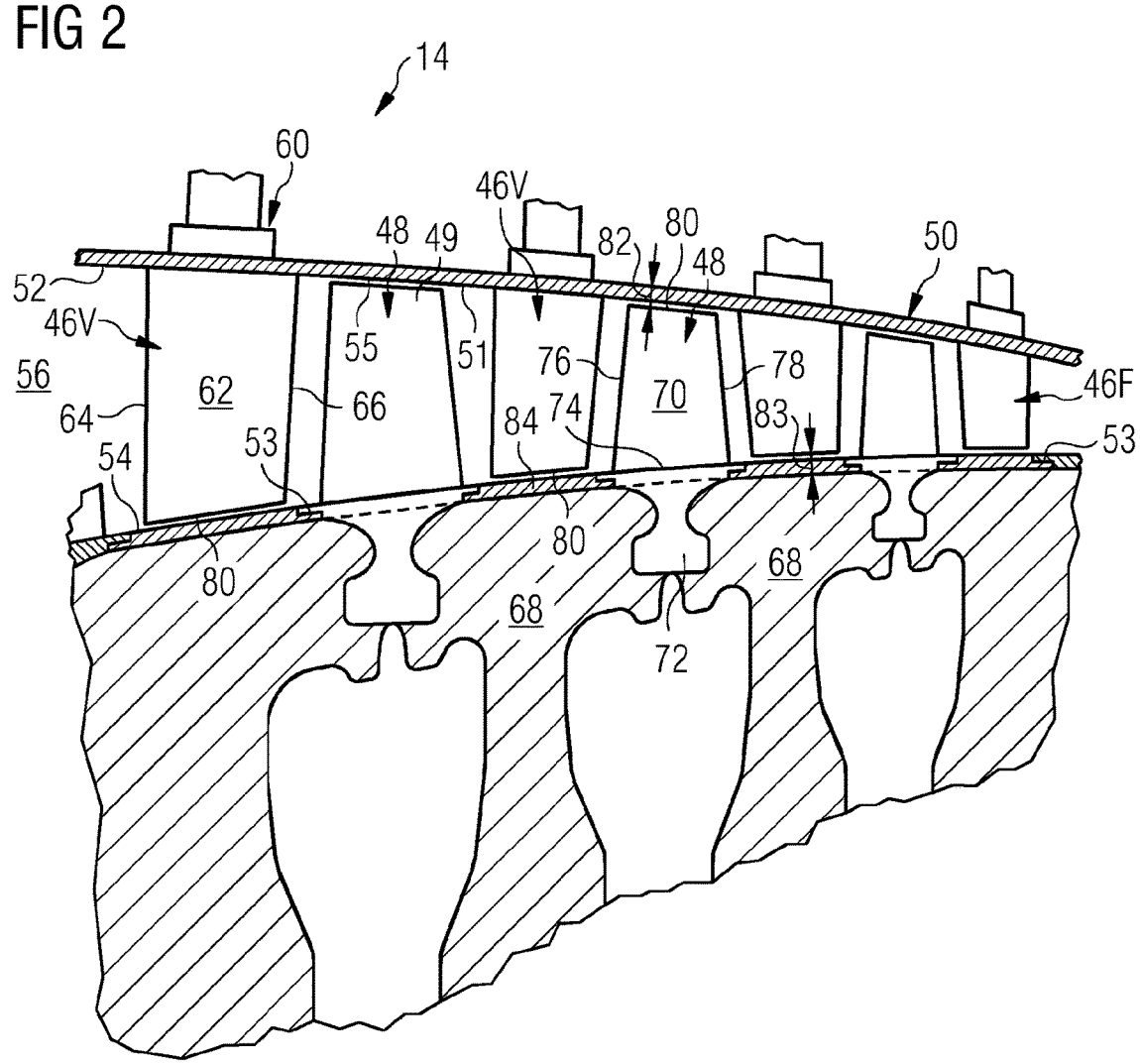

Referring to FIG. 2, the compressor 14 of the turbine engine 10 includes alternating rows of stator guide vanes 46 and rotatable rotor blades 48 which each extend in a generally radial direction into or across the passage 56.

The rotor blade stages 49 comprise rotor discs 68 supporting an annular array of blades 48. The rotor blades 48 are mounted between adjacent discs 68 as shown here, but each annular array of rotor blades 48 could otherwise be mounted on a single disc 68. In each case the blades 48 comprise a mounting foot or root portion 72, a platform 74 mounted on the foot portion 72 and an aerofoil 70 having a leading edge 76, a trailing edge 78 and a blade tip 80. The aerofoil 70 is mounted on the platform 74 and extends radially outwardly therefrom and towards the surface 52 of the casing 50 to define a blade tip gap or blade clearance 82.

The radially inner surface 54 of the passage 56 is at least partly defined by the platforms 74 of the blades 48 and compressor discs 68. In the alternative arrangement mentioned above, where the compressor blades 48 are mounted into a single disc the axial space between adjacent discs may be bridged by a ring 84, which may be annular or circumferentially segmented. The rings 84 are clamped between axially adjacent blade rows 48 and are facing the tip 80 of the guide vanes 46. In addition as a further alternative arrangement a separate segment or ring can be attached outside the compressor disc shown here as engaging a radially inward surface of the platforms.

FIG. 2 shows two different types of guide vanes, variable geometry guide vanes 46V and fixed geometry guide vanes 46F. The variable geometry guide vanes 46V are mounted to the casing 50 or stator via conventional rotatable mountings 60. The guide vanes comprise an aerofoil 62, a leading edge 64, a trailing edge 66 and a tip 80. The rotatable mounting 60 is well known in the art as is the operation of the variable stator vanes and therefore no further description is required.

The guide vanes 46 extend radially inwardly from the casing 50 towards the radially inner surface 54 of the passage 56 to define a vane tip gap or vane clearance 83 therebetween.

Collectively, the blade tip gap or blade clearance 82 and the vane tip gap or vane clearance 83 are referred to herein as the 'tip gap'. The term 'tip gap' is used herein to refer to a distance, usually a radial distance, between the tip's surface of the aerofoil portion and the rotor drum surface or stator casing surface. The term aerofoil applies to both rotor blades and stator vanes and the present invention is applicable to either type of aerofoil.

Figure 3A:
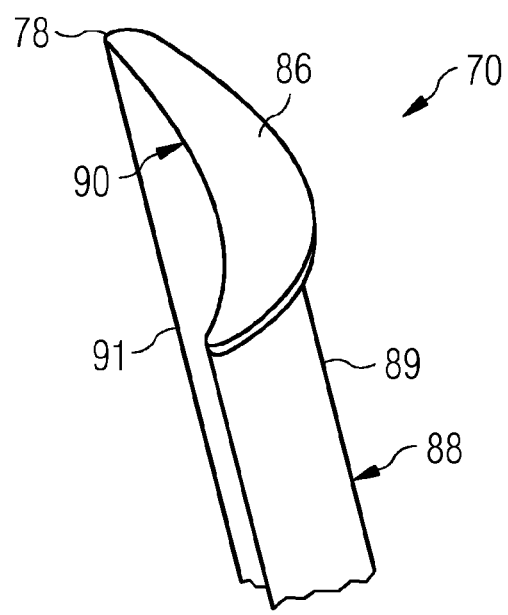
FIG. 3A is a view towards a leading edge of part of a compressor aerofoil having a generalised winglet overhanging a suction surface.
Figure 3B:
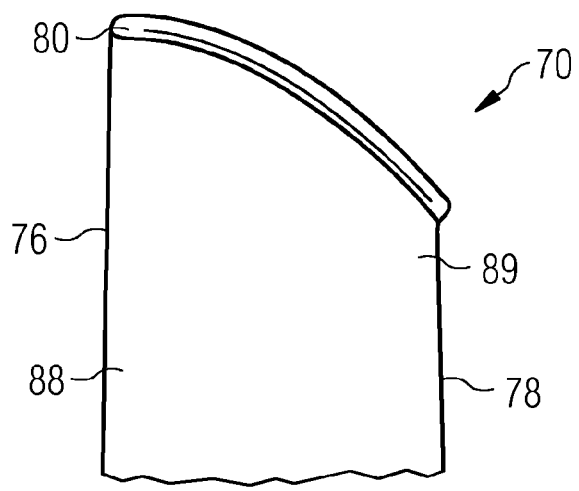
FIG. 3B is a view towards the suction surface of part of a compressor aerofoil having the generalised winglet overhanging the suction surface.
Figure 4:
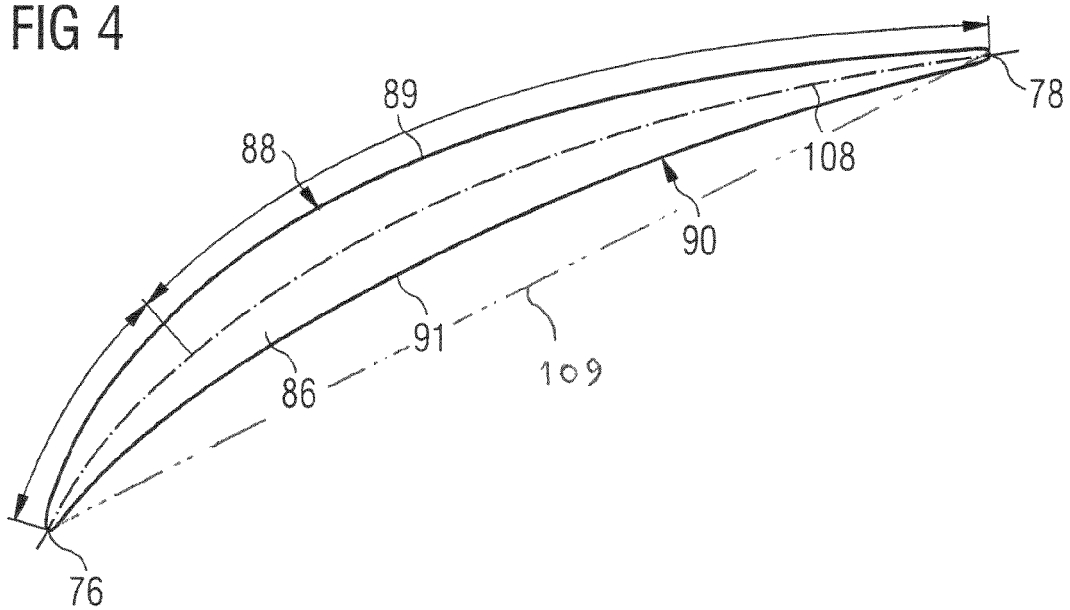
FIG. 4 is a radial view on a tip of a compressor aerofoil without a winglet.

Referring now to FIGS. 3A, 3B which are views of a part of a compressor aerofoil 70, 62 having a schematic and generalised winglet and FIG. 4 which is a schematic radial section through a compressor aerofoil. The compressor aerofoil 70 comprises a suction surface wall 88 and a pressure surface wall 90 meeting at the leading edge 76 and the trailing edge 78. The suction surface wall 88 has a suction surface 89 and the pressure surface wall 90 has a pressure surface 91. The term suction side refers to the region of and adjacent to the suction surface and the term pressure side refers to the region of and adjacent to the pressure surface. In FIG. 4, the tip 80 of the aerofoil 70 forms the tip surface 86. The tip gap 82, 83 is defined by the tip surface 86 and the radially facing surface 52, 54 respectively. The radial extent of the tip gap is defined from the tip surface 86 and the radially facing surface 52, 54. It should be appreciated that the radial extent of the tip gap 82, 83 can vary between non-operation and operation and during engine operation.

In FIG. 4, the aerofoil 70 has a mean camber line 108 that is defined by a camber line passing through the leading edge 76 and the trailing edge 78 and is mid-way between the suction surface and pressure surface of the aerofoil. The length of the camber line 108 is defined as the length from the leading edge 76 to the trailing edge 78 along the tip surface 86. The aerofoil 70 has a chord line 109 that is defined by a straight line from the leading edge 76 to the trailing edge 78 along with its associated length or 'chord length' 109. A compressor made up of stationary and rotating blades where the rotating blades rotate in a direction that has a component opposite to a vector normal to a tangent of the camber line.

In a compressor the direction of rotation is from the convex side (suction surface 89) of the blade towards the concave side (pressure surface 91), whilst the opposite is true in turbines. As the compressor aerofoil is forced through the air stream, high pressure air forms on the pressure side and relatively low pressure air forms on the suction side. The resulting pressure difference causes a portion of the air stream to flow over the tip 80 from the pressure side to the suction side. Reduction of the pressure difference across the tip gap, for the same gap size, can reduce leakage flow and the impact it has on loss and blockage in the region radially inner or outer surfaces 54, 52 which are collectively known as the endwall region.

Introducing a winglet on the suction surface 89, near the tip gap, further reduces the pressure difference across the gap. The winglet extends perpendicular to the suction surface into the passage 58 between circumferentially adjacent aerofoils 70. The pitch P is the distance between corresponding parts of circumferentially adjacent aerofoils 70 and the 'direction' of pitch is in the rotational or circumferential direction.

Figure 5:
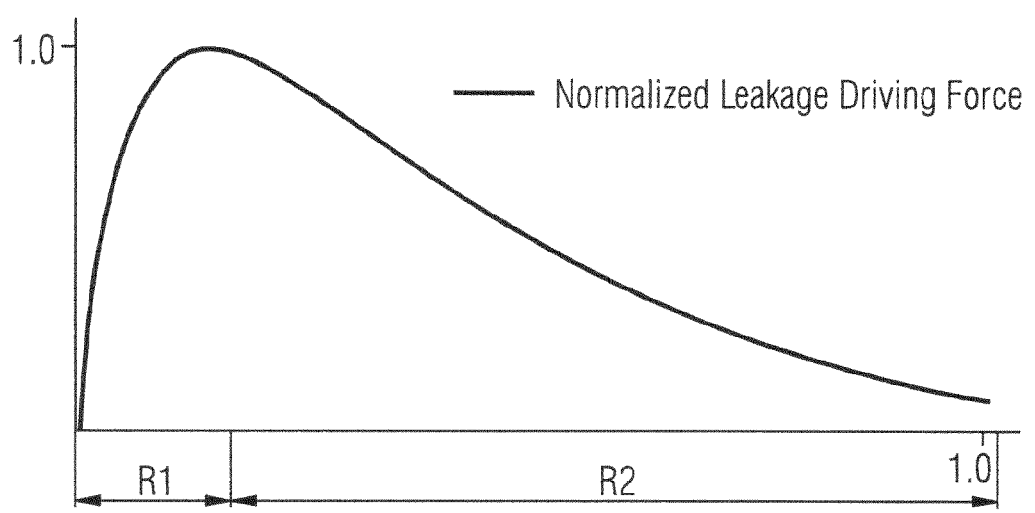
FIG. 5 is a graphical representation of normalised over-tip leakage driving force (y-axis) along the mean camber line of an aerofoil (x-axis)

The design of the winglet 100 can be split into combating two key loss mechanisms, a first loss mechanism which is caused by the reduction in blade tip loading, this reduces the leakage flow through the gap and the deleterious effect it has on loss and blockage and a second loss mechanism caused by generation of corner separations on the suction surface close to the endwall 52, 54. Referring to FIG. 4, the suction side of a compressor aerofoil can be split into two regions where different flow regimes can exist. A first region R1 is located toward the leading edge 76 and is a region of accelerating air flow due to a positive pressure gradient A second region R2 is a region of decelerating flow caused by a negative pressure gradient. Region R1 has a greater average pressure difference across the tip gap than region R2 and hence contributes relatively more to the overall leakage mass flow as can be seen in FIG. 5. Reducing the pressure difference across the gap in region R1 is key to the reducing the total leakage mass flow. However, due to the negative and adverse pressure gradient in region R2, this region is particularly susceptible to separations.

Depending on the specific geometry of each aerofoil and its location within the compressor, region R1 extends from the leading edge 76 to a distance falling between and included in the range 5-60% of the length of the camber line 108. Region R2 covers the remainder the length of the camber line 108.

Figure 6:
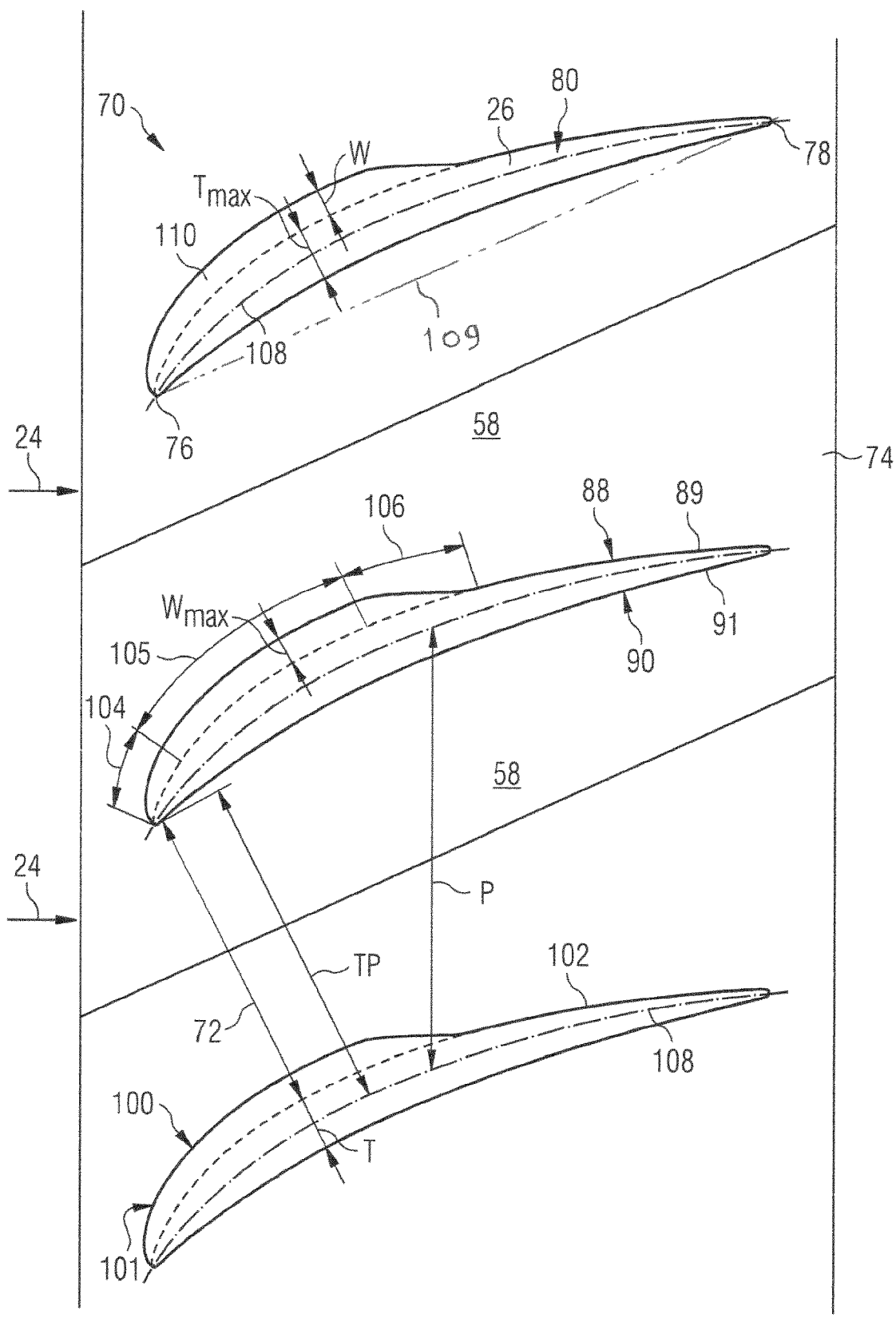
FIG. 6 is a view looking radially inwardly on part of a rotor stage of the compressor and shows tip surfaces of three circumferentially adjacent aerofoils of the annular array of aerofoils. The aerofoils comprise an exemplary winglet configuration in accordance with the present invention.

Referring now to an exemplary embodiment of the present invention as depicted in FIG. 6, which is a radially inward view on the compressor and shows three circumferentially adjacent aerofoils 70 of the annular array of aerofoils of a rotor stage. A flow passage 58 is defined between the pressure surface 91 and suction surface 89 of circumferentially adjacent aerofoils 70 and between the platforms 74 and the casing 52. A throat plane 72 is a minimum area of the flow passage 58. The throat plane 72 in this example is shown at the leading edge 76 of one aerofoil although in other examples the throat could be anywhere along the camber line and including at the trailing edge 78 of the opposing aerofoil.

The terms leading edge and trailing edge are intended to indicate a region that includes the respective geometric edge and approximately 2% of the length of the mean camber line about the geometric edge and will include the aerodynamic edge. It should be noted that the aerodynamic edge or stagnation point can vary depending on operational conditions and radial height along the aerofoil.

Compressor and turbines aerofoils are differentiated by virtue of the turbine being driven by the hot expanding gases from the combustor whereas the compressor draws into the engine and compresses ambient air. One of many configurational differences is that compressor aerofoils have a thinner sectional profile between pressure and suction surfaces than turbine aerofoils and in particular relative to their respective pitches P. It is possible to differentiate a compressor aerofoil from a turbine aerofoil by virtue of its maximum thickness T to pitch P ratio. For a compressor aerofoil Tmax/chamber line length may be between 0.025 and 1.0. Another way of differentiating the compressor aerofoil from a turbine aerofoil is by virtue of the ratio of its maximum thickness Tmax to the length of its chord line 109. For the present compressor aerofoil 70 a Tmax/chord length relationship can be up to 0.1 or 10% although more commonly up to 0.05 or 5% and is particularly common between 0.02 and 0.03 or 2% and 3%. In contrast a turbine blade or vane, particularly ones that have internal cooling passages, the Tmax/chord length relationship is above 10% and will typically exceed 12%.

The compressor aerofoils 70 further comprise a winglet 100 located at the tip 80 and which extends from the suction surface 89 in a perpendicular direction to the suction surface 89. The winglet 100 has two main parts, a leading part 101 and a trailing part 102. The leading part 101 is design to address reduction of the total leakage\the tip of the aerofoil. The trailing part 102 is designed to address flow separations that occur further downstream.

The leading part 101 is itself constituted by three parts a leading portion 104, a middle region 105 having a maximum overhang $W_{max}$ and a trailing portion 106. The middle region 105 has a constant overhang W which in this case is the maximum overhang $W_{max}$. In this example, the leading portion 104 extends from the suction surface 89 in a perpendicular direction a distance 0.6Tmax, but this overhang can be anywhere between and including 0.6Tmax and 1.0Tmax for some of the most favourable results and between and including 0.1Tmax to 1.5Tmax to gain at least some of the benefits. Another range which is particularly useful to meet the objectives is the overhang, particularly Wmax, can be between 1.05Tmax and 1.99Tmax. Therefore, the overhang can be between 0.1Tmax and 1.99Tmax.

The winglet 100 has a maximum overhang $W_{max}$ that occurs within 60% of the length of the mean camber line 108 from the leading edge 76. The maximum overhang W should be located within 10% of the length of the mean camber line of the maximum tip thickness $T_{max}$ location. The extent of maximum overhang determines the drop in pressure difference.

In this exemplary winglet 100 the leading portion 104 of the winglet 100 has a blend in portion 104 which extends a distance of approximately 10% of the length of the mean camber line 108 and is located between the middle portion 105 and the leading edge 76. In other examples, the leading portion 104 of the winglet 100 has a blend in portion 104 which extends a distance in the range between the leading edge 76 and the maximum aerofoil thickness $T_{max}$ location. The blend in portion 104 can start at any position within the range between the leading edge 76 and up to 2% of the length of the mean camber line 108 from the maximum aerofoil thickness $T_{max}$ location.

The leading portion 101 of the winglet 100 has a blend out portion 106 which extends a distance of approximately 20% of the length of the mean camber line 108 and is located between the middle portion 105, in particular the maximum overhang $W_{max}$ position, and the trailing edge 78. The blend out portion 105 smoothly blends the winglet overhang from the middle portion 105 to the trailing edge portion 102 thereby minimising any aerodynamic disturbance as the leading portion 101 transitions to the trailing edge portion 102.

In the exemplary embodiment of the winglet 100 shown in FIG. 6, the middle portion 105 has a constant overhang. Here the constant overhang extends along the suction surface 89 approximately 45% of the length of the camber line 108. In other examples the constant overhang can extend to be between and include 0% and 65% of the length of the camber line 108. The winglet 100 in the trailing portion 102, that is susceptible to corner separations, is reduced to a zero overhang or in other words takes the form of the 'original' aerofoil shape at the tip 80. As will be described later the trailing portion 102 can form either an overhang of the suction surface or be recessed from the suction surface towards the pressure surface.

Reference is now made to FIGS. 7-10 which show alternative winglet 100 configurations in accordance with the present invention.

Figure 7:
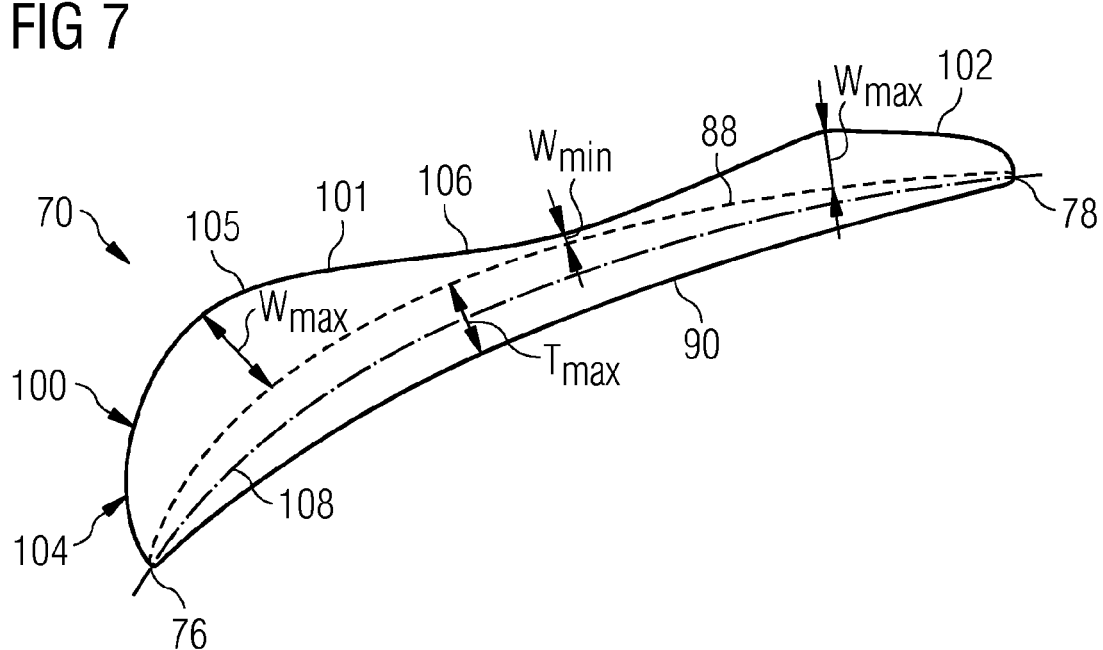
FIGS. 7-10 are views looking radially inwardly on the tip of an aerofoil which show alternative winglet configurations in accordance with the present invention.

The aerofoil in FIG. 7 has a winglet configuration where the beneficial effect on the first mechanism is greater than the beneficial effect on the second mechanism, thus the winglet reduces the overall loss and blockage compared to a compressor aerofoil without a winglet. The leading portion 101 of the winglet has a first maximum overhang $W_{max}$ approximately 1 times the maximum aerofoil thickness, $T_{max}$. The first maximum overhang $W_{max}$ position is located approximately 20% of the length of the camber line 108 from the leading edge 76. The overhang 100 blends or gradually increases from a zero overhang at the leading edge 76 to the maximum overhang $W_{max}$ position. From the maximum overhang $W_{max}$ position the overhang reduces to a minimum overhang $W_{min}$ position between the leading portion 101 and trailing portion 102. The minimum overhang $W_{min}$ is approximately 0.25T. In this embodiment, the minimum overhang $W_{min}$ position located approximately 55% of the length of the camber line 108 from the leading edge 76. From the minimum overhang $W_{min}$ position the overhang 100 blends or gradually increases to a second maximum overhang $W_{max}$ approximately 0.75 times the maximum aerofoil thickness, $T_{max}$, i.e. 0.75T. The second maximum overhang $W_{max}$ position is located approximately 80% of the length of the camber line 108 from the leading edge 76. At the trailing edge 78, the overhang sharply, but smoothly, reduces to zero In modifications of the aerofoil 70 in FIG. 7, the first maximum overhang $W_{max}$ position may be located approximately 10% to 30% of the length of the camber line 108 from the leading edge 76. The second maximum overhang $W_{max}$, position may be located approximately 70% to 90% of the length of the camber line 108 from the leading edge 76. The first maximum overhang $W_{max}$ may be between 0.2T and 1.5T. The second maximum overhang $W_{max}$ may be between 0.1T and 1T. The first maximum overhang $W_{max}$ is greater that the second maximum overhang $W_{max}$. The minimum overhang $W_{min}$ may be between and include 0.2T and 0.5T.

Figure 8:
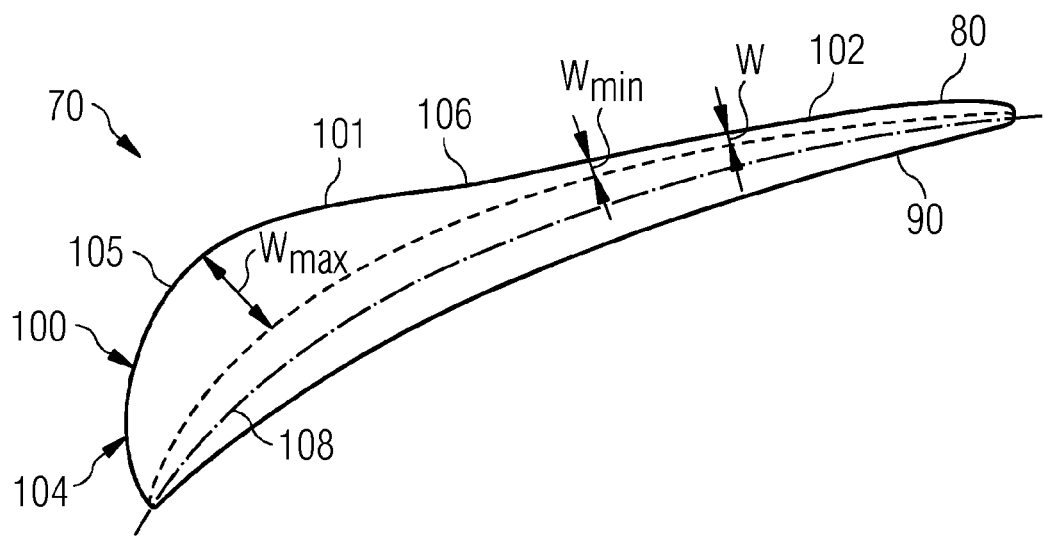
Figure 9A:
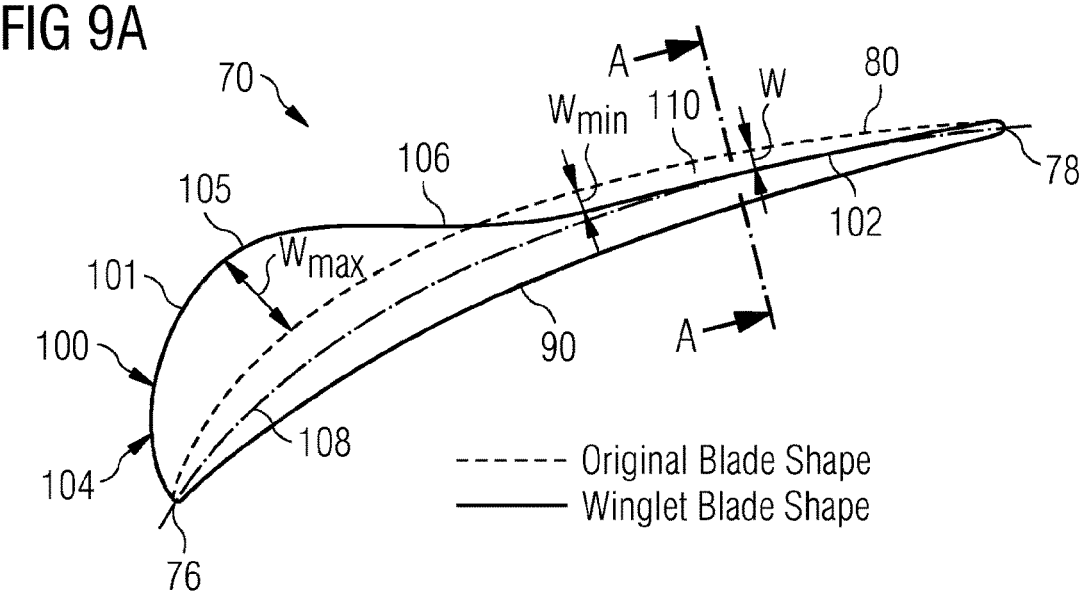
Figure 9B:
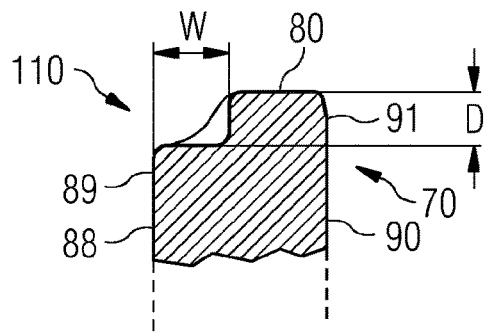

The aerofoil in FIG. 8 has a winglet configuration where the leading portion 101 is similar to the FIG. 7 winglet and will not be described again. In the FIG. 8 winglet configuration, from the minimum overhang $W_{min}$ position the overhang 100 maintains a constant overhang W. Here the minimum overhang $W_{min}$ and the constant overhang W are approximately 0.25T.

Another example of the present aerofoil is shown in FIGS. 9A and 9B where again the winglet configuration at the leading portion 101 is similar to the FIG. 7 winglet and will not be described again. In the FIG. 9A, 9B winglet configuration, the trailing part 102 is negative, that is to say, there is a recess or step back 110 from the suction surface 89 towards the pressure surface 91. The step back 110 extends or has a negative 'overhang' W of approximately 0.5T and can be up to 0.5T from the suction surface 89. The radial depth D of the recess 110 is approximately 2% of the length of the mean camber line. Rather than a sharp radius recess 110, the recess can be defined by a smooth S-shaped profile as shown by the dashed line for example comprising two blended radii.

Figure 10:
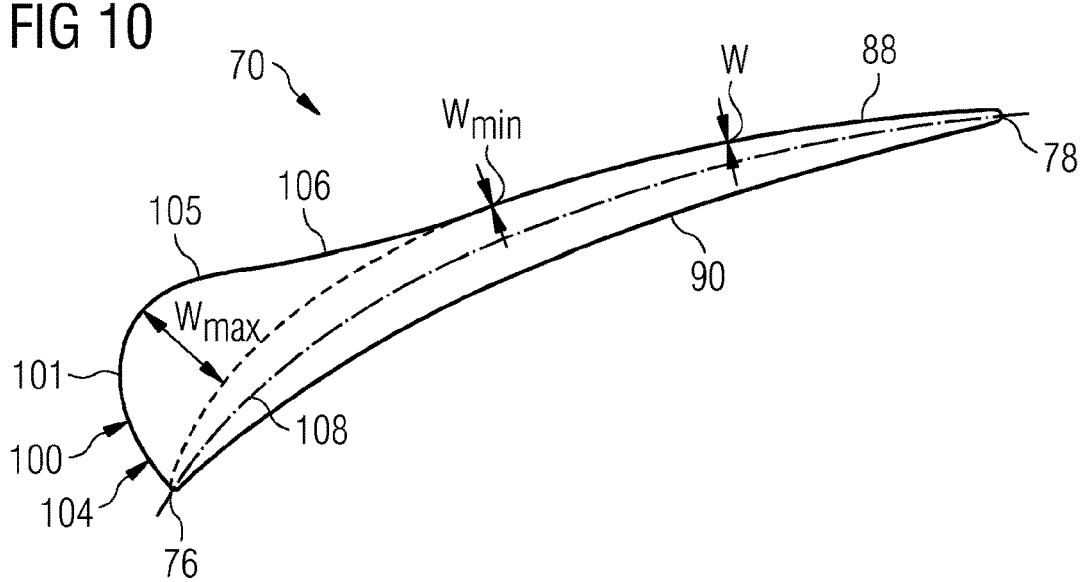

In FIG. 10 the leading portion 101 of the winglet has a maximum overhang $W_{max}$ approximately 1.5 times the maximum aerofoil thickness, $T_{max}$. The first maximum overhang $W_{max}$ position is located approximately 10% of the length of the camber line 108 from the leading edge 76. The overhang 100 blends or gradually increases from a zero overhang at the leading edge 76 to the maximum overhang $W_{max}$ position. From the maximum overhang $W_{max}$ position the overhang reduces to a minimum overhang $W_{min}$ position between the leading portion 101 and trailing portion 102. The minimum overhang $W_{min}$ is approximately 0T. In this embodiment, the minimum overhang $W_{min}$ position located approximately 45% of the length of the camber line 108 from the leading edge 76. From the minimum overhang $W_{min}$ position the overhang 100 in the trailing portion 102 remains approximately zero to the trailing edge 78.

FIG. 8-10 all trade reductions in the corner separation size for a increase in leakage flow. i.e FIG. 9 winglet will have the smallest corner separation but also the largest tip leakage flow (still less than the original blade), whilst FIG. 8 will have the largest corner separation but also the smallest tip leakage flow. Which design is optimal will depend on individual compressor blade design.

Thus in summary the trailing portion 102 may have an overhang ranging between $-0.5T_{max}$ and $1T_{max}$ of the maximum aerofoil thickness. The point where the winglet blends between leading portion 101 and the trailing portion 102 can be anywhere from 5% to 40% of length of the mean camber line 108 from and downstream of the maximum aerofoil thickness $T_{max}$ location.

Figure 11A:
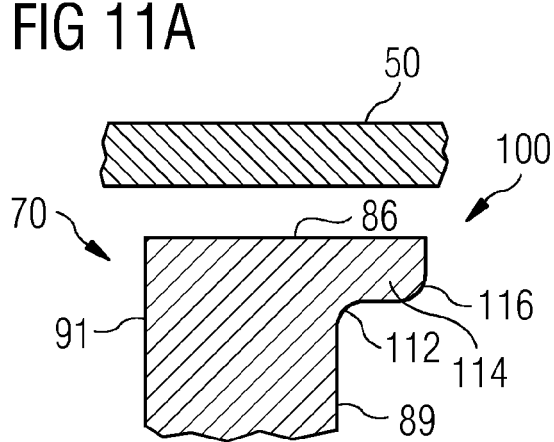
FIGS. 11A-11C show three examples of the cross sectional profile of the aerofoil in the region of the winglet and the casing.
Figure 11B:
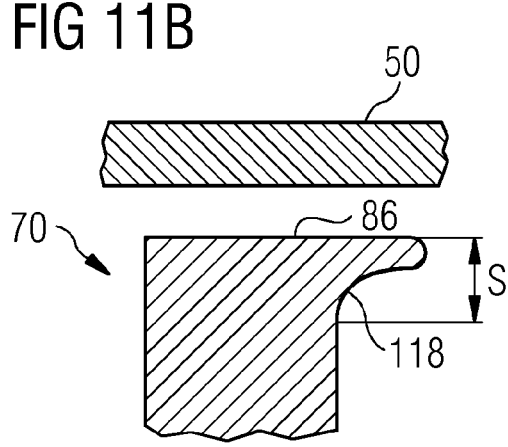
Figure 11C:
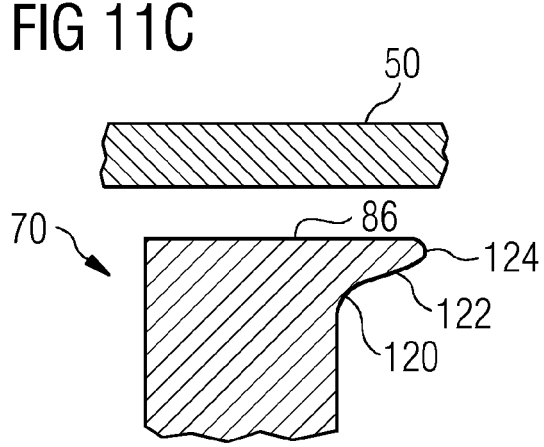

FIGS. 11A-11C shows three examples of the cross sectional profile of the aerofoil 70 in the region of the winglet 100 and the casing 50. In all three and any other examples, the winglet 100 extends a distance S along the radial or spanwise direction of the suction surface 89. The radial extent of the winglet 100 starts at the tip surface 86 and forms part of the tip surface. The distance S can be up to 15% of the radial or spanwise dimension of the suction surface 86. The radial extent of the suction surface is measured from the platform 74 to the tip surface 86. In the FIG. 6 embodiment the radial extent S of the winglet 100 is 1-3% where the maximum overhang $W_{max}$ exists in the leading portion 101 of the winglet 100. In the FIG. 7 and FIG. 8 embodiments the radial extent S of the winglet 100 is 1-3% where the maximum overhang $W_{max}$ exists in the trailing portion 102 of the winglet 100. In other examples, the radial extent S of the winglet 100 can be up to 15%.

In FIG. 11A the radial or spanwise profile, in a direction along the suction surface 89 towards the tip surface 86, comprises a first radius 112 blending from the suction surface 89 to a generally constant thickness section 114 of the winglet and then a second radius 116 to the tip surface 86. In FIG. 11B the profile comprises a single radius 118 from the suction surface 89 to the tip surface 86. In FIG. 11C the radial or spanwise profile comprises a first radius 120 blending from the suction surface 89 to a radially inclined surface 122 and then a second radius 124 blending into the tip surface 86. For any aerofoil it is possible for the winglet to have any one or more of these profiles along its length. In particular where the winglet has a recess, e.g. FIG. 9A, the radial profile can change from the profile shown in FIG. 11A to the profile shown in FIG. 11B as the winglet blends from an overhang into the recess.

The tip gap 82, 83 is kept as small as possible and often with conventional aerofoils a certain amount of rubbing between the aerofoil tip and the casing or drum is permitted and indeed can be design for. However, the presence of the winglet 100 and thickening of the aerofoil tip and hence the associated increase in aerofoil tip area may cause tip rubs that are not acceptable. To alleviate this potential problem some aerofoil material is removed from the tip surface 86. Two examples of material removal are shown in FIGS. 12 and 13, which are otherwise similar to the FIG. 6 embodiment.

Figure 12A:
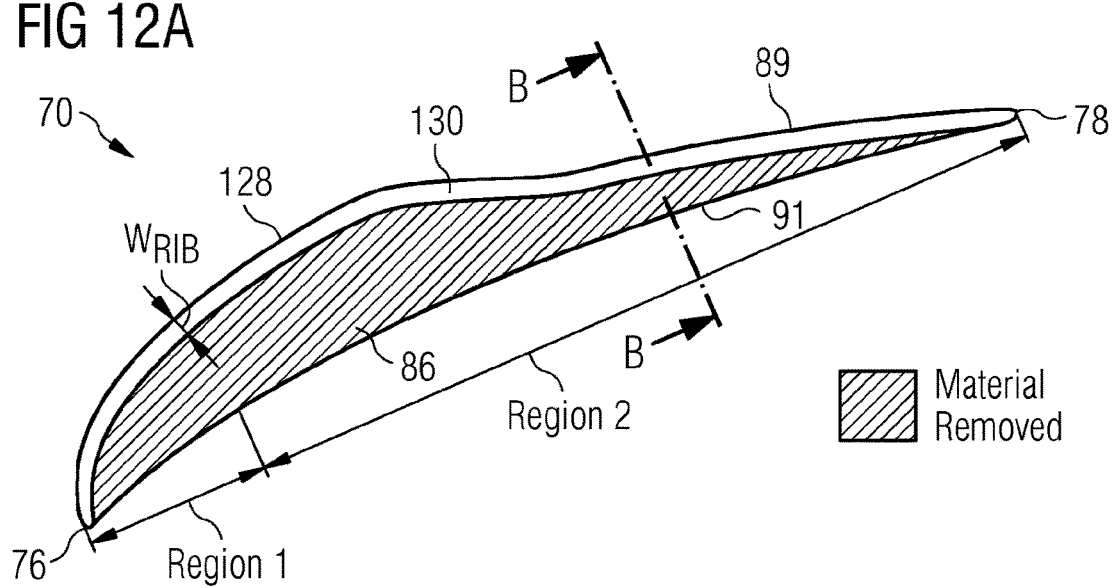
FIG. 12 is a view looking radially inwardly on the tip of an aerofoil which shows an alternative winglet configuration having a cavity and in accordance with the present invention.
Figure 12B:
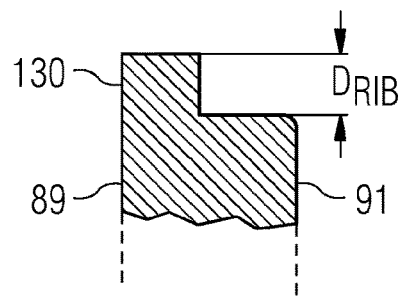

FIG. 12A is a view looking radially inwardly on the aerofoil's 70 tip surface 86 and FIG. 12B is the section BB shown in FIG. 12A. Material has been removed from the tip of the aerofoil from the pressure surface 91 towards the suction surface 89 except for a relatively thin strip of material or suction rib 130 at the suction surface edge 128 of the winglet 100. The width $W_{rib}$ of the suction rib 130 is 25% of the maximum thickness of the aerofoil Tmax. In this example, the suction rib 130 has a constant width, but in other examples the suction rib 130 may vary in width between 5 and 70% of $T_{max}$. At the leading edge 76 and trailing edge 78 the suction rib 130 is the full width of the aerofoil particularly within 2% of the length of the camber line 108 from each respective edge 76, 78. Thus material is removed only in a region between 2% and 98% of the length of the mean camber line 108 from the leading edge 76. In other examples the suction rib 130 the width $W_{rib}$ is within 15-35% of the maximum thickness of the original aerofoil $T_{max}$. The suction rib 130 generally follows the contour of the edge 128 on the suction surface of the winglet.

Figure 13:
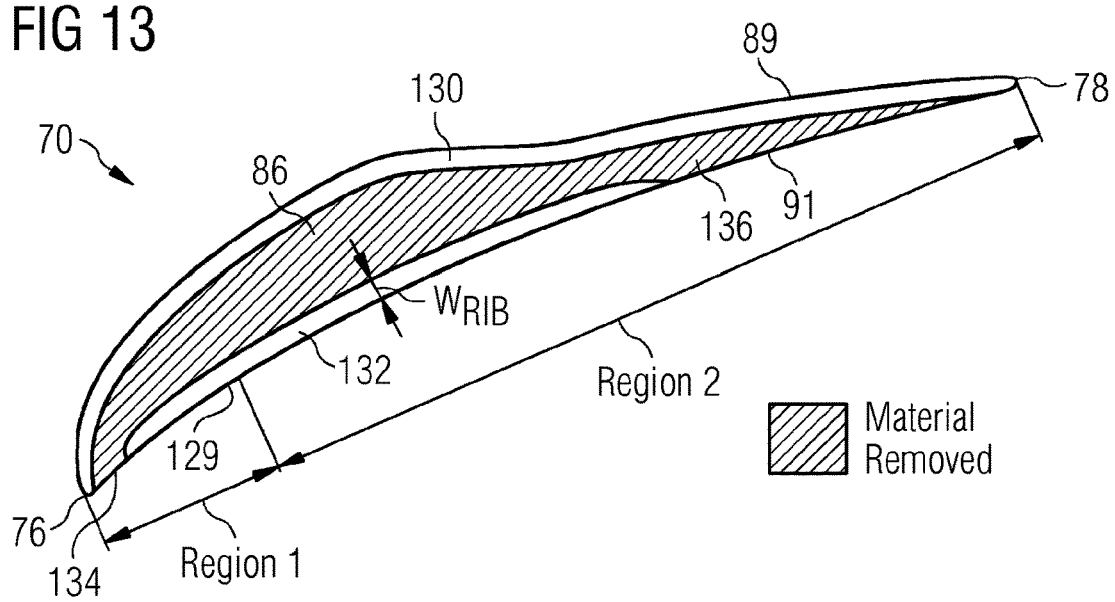
FIG. 13 is a view looking radially inwardly on the tip of an aerofoil which shows another alternative winglet configuration having a cavity and in accordance with the present invention.

In FIG. 13 the aerofoil 70 is generally similar to that of FIGS. 12A and 12B and like reference numeral denote like features. Here a pressure rib 132 is formed at the edge 129 of the pressure surface 91 of the winglet 100. The tip gap of the ribs remains the same the same as tip gap of the original blade. The width $W_{rib}$ of the pressure rib 132 is the same as the suction rib 130 in this example, but can be a different width to the suction rib 130 but within 15-35% of the maximum thickness of the original aerofoil $T_{max}$. In this example, the width and extent along the edge 129 of the pressure rib 132 is limited by the dimensions of the suction rib 130 and a leading gap 134 and a trailing gap 136 are present between the suction and pressure ribs. Thus two gaps 134, 136 are formed at the edge 129 of the pressure surface, one near the leading edge 76 and the other near the trailing edge 78. The pressure rib 132 follows the contour of the edge 129 on the pressure surface of the winglet.

In both FIG. 12 and FIG. 13 examples the depth or radial or spanwise extent $D_{rib}$ of material removed is 0.5% of the length of the mean camber line 108, although depths in the range between 0.25% and 4% of the length of the mean camber line 108 will be beneficial in preventing undesirable tip rubs. Thus the suction and/or pressure rib 130, 132 height is in the range 0.25 and 4% of the length of the mean camber line from the remainder of the tip surface 86.

Figure 14A:
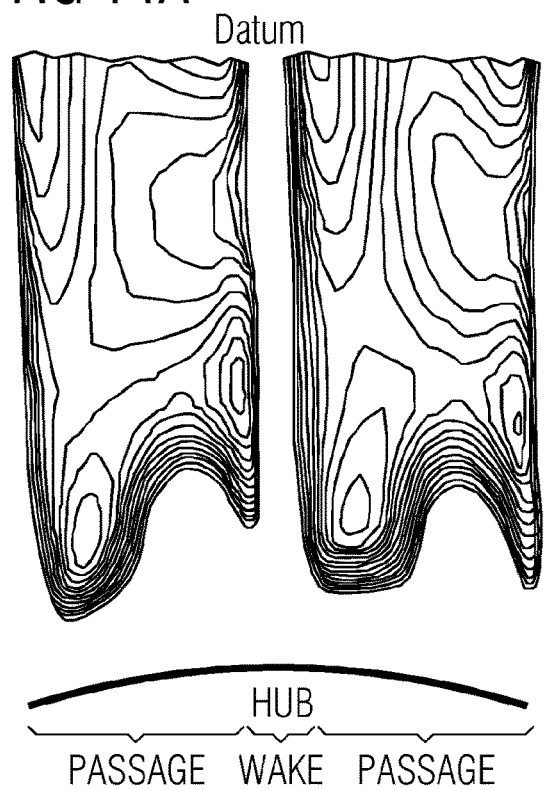
FIGS. 14A and 14B shows exit contour plots of non dimensional loss near the hub downstream of an aerofoil operating at a design point without (datum) and with the present winglet respectively.
Figure 14B:
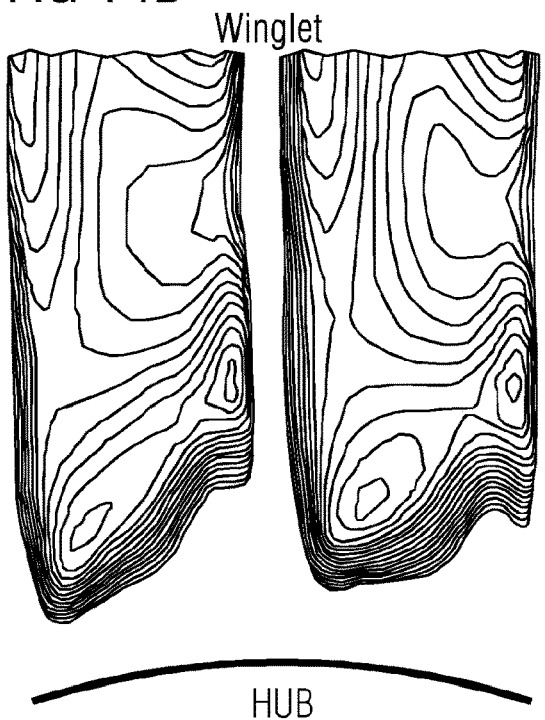
Figure 15:
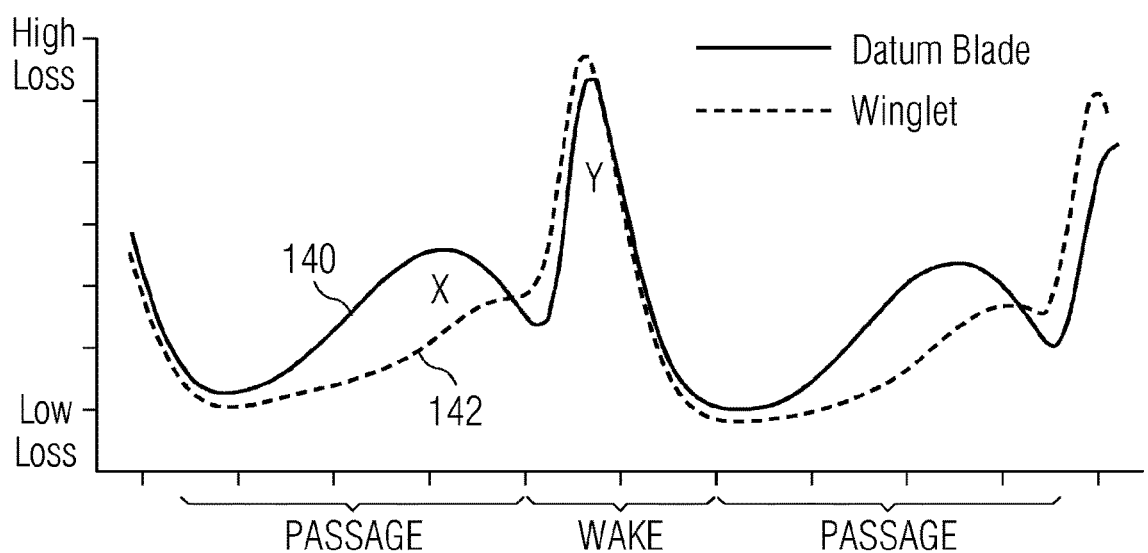
FIG. 15 is a is a graphical representation of relative aerodynamic losses of a datum aerofoil and the present compressor aerofoil having a winglet in accordance with the winglet of present invention and as shown and described with reference to FIG. 14A, 14B, FIGS. 16A, 16B and 16C are views on the suction surface of a compressor aerofoil without a winglet (datum), with an oversized winglet and the present inventive compressor aerofoil with a winglet respectively and show streamlines of the compressed airflow about the suction surface.

FIGS. 14A and 14B show exit contours of non dimensional loss near the hub downstream of a stator vane row operating at the design point of a datum aerofoil and the present compressor aerofoil 70 having a winglet 100 respectively. FIG. 15 is graphical representations of relative aerodynamic losses of the datum aerofoil and the present compressor aerofoil 70 having a winglet 100 as described with reference to FIG. 6 in particular.

The datum aerofoil is represented by the solid line 140 and the winglet aerofoil 70 is represented by the dashed line 142. High loss regions correspond to values near X and low loss regions correspond to values near zero. These results were measured in an embedded stage of a low speed research facility. In FIG. 15 the loss has then been mass average in the spanwise (radial) directions for the 10% of mass flow nearest the hub. This value is then plotted against aerofoil pitch to show how it varies around the annulus. The datum aerofoil without a winglet is represented by the solid line 140 and the winglet aerofoil 70 is represented by the dashed line 142. The presence of the winglet 100 can be seen to have a significantly reduced loss in the passage at X. Whilst in the wake region the loss has slightly increased in region Y. This is due to the second loss mechanism discussed causing or exasperating corner separations. It can be clearly seen that the total loss has been greatly reduced by the addition of the winglet 100. Experiments were also carried out at a near stall operating point and these showed a similar benefit to that found at the design operation point.

Figure 16A:
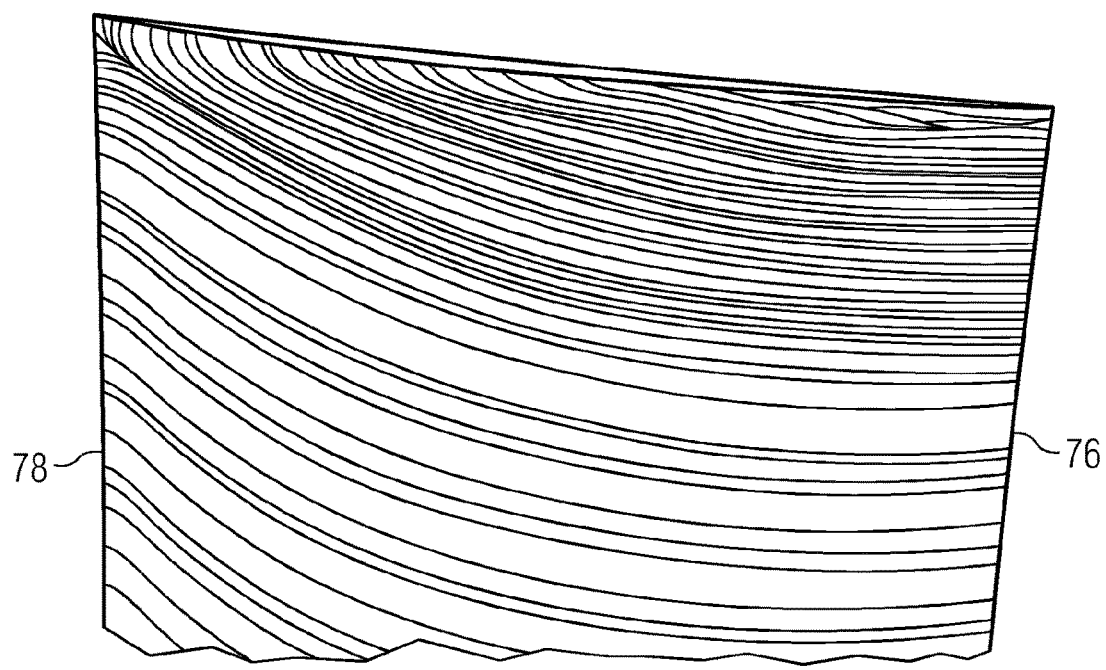
Figure 16B:
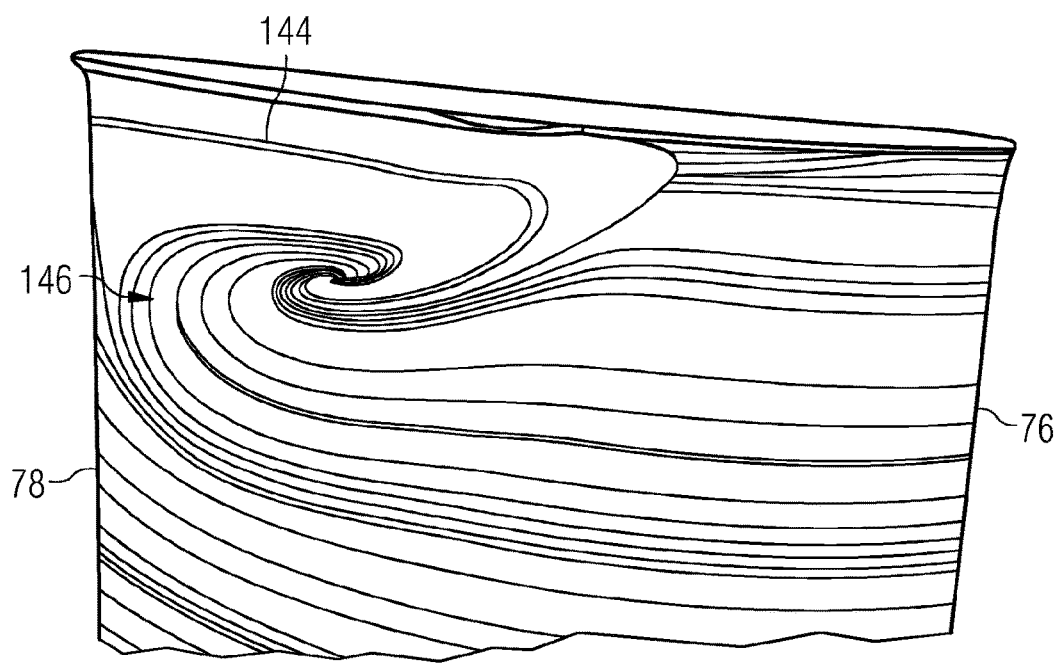
Figure 16C:
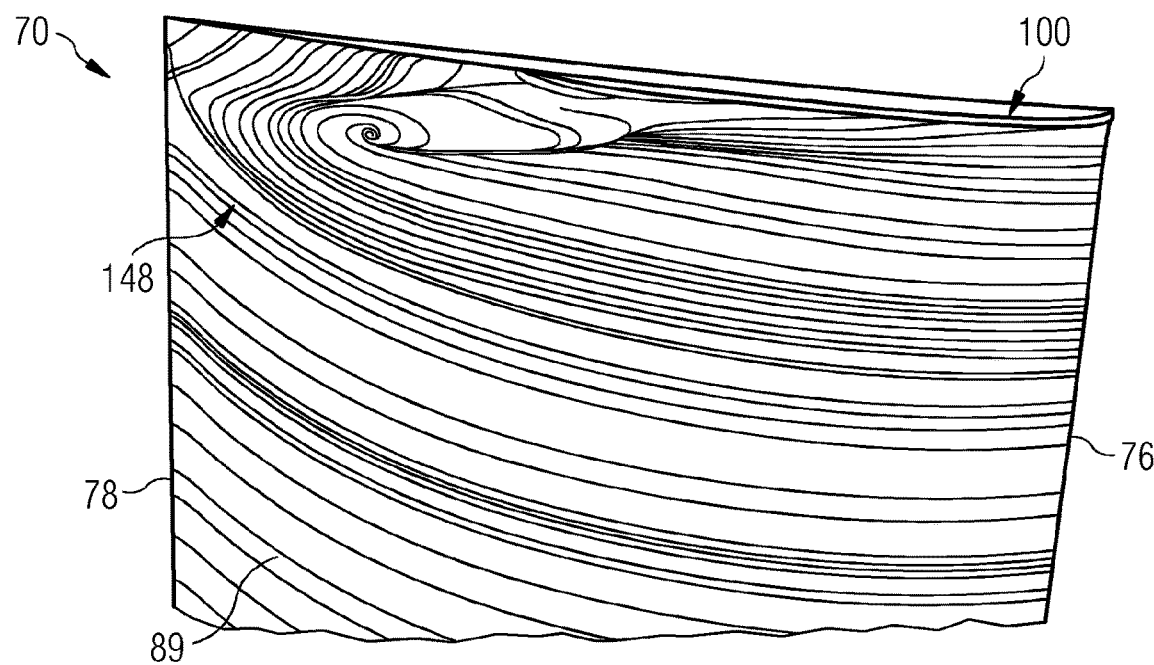

FIGS. 16A, 16B and 16C are views on the suction surface 89 near the tip 80 of a compressor blade without a winglet (a datum blade), a blade with an oversized winglet and the present compressor aerofoil, in this case a blade, with the winglet 100 respectively and show streamlines of the compressed airflow about the suction surface 89. The leading edge 76 of the aerofoils is on the right hand side of the figures and the trailing edge on the left hand side. Corner separations occur when the fluid near the surface of the blade suddenly and rapidly gets displaced into the main stream. Corner separations are noticeable due to a larger increase in loss in the regions they occur.

For the datum blade in FIG. 16A, without any winglet, the over tip leakage flow blows off the suction surface boundary layer and into the passage between aerofoils. This means the low momentum fluid near the endwall (casing or rotor hub) is replaced by higher momentum fluid from the mainstream of the compressor airflow. This can be seen by the suction surface streamlines moving up the blade towards the blade tip from the leading edge 76 towards the trailing edge 78. This high momentum fluid is able to withstand the adverse pressure gradient in this region and no separation occurs.

Referring to the aerofoil in FIG. 16B, the addition of a full chord and oversized winglet stops the over tip leakage flow from refreshing the boundary layer near the endwall. This is reflected in the streamline 144 travelling parallel to the tip of the blade. The low momentum fluid isn't getting driven off the blade surface by the over tip leakage, it hasn't got the energy to withstand the adverse pressure gradient in region Y (see FIG. 15) and separates from the suction surface. This is shown by the streamlines 146 rolling up towards the oversized winglet. The aerodynamic losses due to this corner separation far outweigh any benefit gained from a reduction in tip leakage flow due to the oversized winglet.

The presently described winglet 100 is show in FIG. 16C. Due to the effective design of this winglet 100 the size of the corner separation 148 has been significantly reduced from the oversized winglet of FIG. 16B. This lesser corner separation 148 is shown by the much smaller region of rolled up streamlines. In this case, the benefit gained from a reduction in tip leakage flow far outweighs the negative effect of this small corner separation 148.

This presently described winglet 100 is applicable to any compressor aerofoil whether a rotor blade rotating within a stationary casing or endwall or a stationary compressor vane having a rotating drum or endwall in close proximity.

While the invention has been illustrated and described in detail for a preferred embodiment the invention is not limited to these disclosed examples and other variations can be deducted by those skilled in the art in practicing the claimed invention. For example, the winglet configuration is not limited to any one of the radial profiles shown in FIGS. 11A-11C and could have a varying profile comprising any one or more for the profiles shown in FIGS. 11A-11C. Similarly, the winglet configuration is not limited to any one of the profiles shown in FIGS. 7-10 and could have any combination or intermediate configuration shown in FIGS. 7-10.

The present invention is also applicable to a compressor blisk that is a bladed disc, where the blades are integrally formed with the disc as is well known in the art. It should be appreciated that repair of a blisk can involve removal and replacement of the blades of the blisk and that the individual compressor blades or aerofoils having a winglet in accordance with the present invention, and prior to be affixed to a blisk, are also considered to be within the scope of the present invention as is the blisk itself.

The present invention is further applicable to axial process compressors such as those found in gas pumping stations.

The invention claimed is:

1. A compressor aerofoil comprising:
a suction surface wall comprising a suction surface and a pressure surface wall comprising a pressure surface, the suction surface wall and the pressure surface wall meet at a leading edge and a trailing edge and define a tip comprising a tip surface, the compressor aerofoil comprises a maximum thickness Tmax,
a mean camber line defined as passing through the leading edge and the trailing edge, and
a winglet at the tip and which extends from the suction surface, the winglet comprises an overhang W that comprises a perpendicular extent from the suction surface in a range 0.1Tmax to 1.99Tmax,
the winglet comprises a maximum overhang Wmax that occurs within 50% of a length of the mean camber line from the leading edge,
wherein the winglet comprises a leading portion and a trailing portion, and
wherein the trailing portion comprises a step back from the suction surface towards the pressure surface.

2. The compressor aerofoil as claimed in claim 1, wherein the range is in any one of g 0.2Tmax to 1.5Tmax, 0.6Tmax to 1.0Tmax, 1.05Tmax to 1.99Tmax, or wherein the overhang W is a distance of 0.6Tmax.

3. The compressor aerofoil as claimed in claim 1, wherein the leading portion of the winglet comprises a blend out portion which extends along the suction surface a distance in the range 5% to 40% of the length of the mean camber line and is located between the maximum overhang Wmax and the trailing portion and which reduces the overhang W from the maximum overhang Wmax to zero.

4. The compressor aerofoil as claimed in claim 1, wherein the leading portion of the winglet comprises a blend in portion which starts at any position within the range between the leading edge and up to 2% of the length of the mean camber line from the maximum overhang Wmax and which increases the overhang W from zero to the maximum overhang Wmax.

5. The compressor aerofoil as claimed in claim 1, wherein in the trailing portion the perpendicular extent from the suction surface is in a range 0.1Tmax to 1Tmax.

6. The compressor aerofoil as claimed in claim 1, wherein the suction surface comprises a suction surface radial extent and the winglet comprises a radial extent S, where the radial extent S is in the range 1-15% of the suction surface radial extent.

7. The compressor aerofoil as claimed in claim 6, wherein the radial extent S is 1-3% of the suction surface radial extent.

8. The compressor aerofoil as claimed in claim 1, wherein the winglet defines a radially outer surface and which is continuous with and forms part of the tip surface.

9. The compressor aerofoil as claimed in claim 1, wherein the winglet comprises a suction rib extending along a suction surface edge of the winglet and extending radially from the tip surface.

10. The compressor aerofoil as claimed in claim 9, wherein a width Wrib of the suction rib is in the range 5 to 75% of the maximum thickness Tmax of the compressor aerofoil.

11. The compressor aerofoil as claimed in claim 10, wherein the width Wrib of the suction rib is 25% of the maximum thickness Tmax of the compressor aerofoil.

12. The compressor aerofoil as claimed in claim 9, wherein the winglet comprises a pressure rib extending along a pressure surface edge of the winglet and extending radially from the tip surface, and the pressure rib and the suction rib define a leading gap and a trailing gap therebetween.

13. The compressor aerofoil as claimed in claim 9, wherein a height of the suction rib from the tip surface is up to 4% of the length of the mean camber line.

14. The compressor aerofoil as claimed in claim 1, wherein the compressor aerofoil comprises a chord line comprising a chord length defined from the leading edge to the trailing edge,
a ratio of the maximum thickness Tmax to the chord length is up to 0.1.

15. The compressor aerofoil as claimed in claim 14, wherein the ratio of the maximum thickness Tmax to the chord length is up to 0.05.

16. The compressor aerofoil as claimed in claim 14, wherein the ratio of the maximum thickness Tmax to the chord length is between 0.02 and 0.03.

17. The compressor aerofoil as claimed in claim 1, wherein the compressor aerofoil is configured to operate in a direction of rotation from the suction surface towards the pressure surface.

18. A compressor aerofoil comprising:

a suction surface wall comprising a suction surface and a pressure surface wall comprising a pressure surface, the suction surface wall and the pressure surface wall meet at a leading edge and a trailing edge and define a tip comprising a tip surface, the compressor aerofoil comprises a maximum thickness Tmax, a mean camber line is-defined as passing through the leading edge and the trailing edge, and a winglet at the tip and which extends only from the suction surface, the winglet comprises an overhang W that comprises a perpendicular extent from the suction surface in a range 0.1Tmax to 1.99Tmax, wherein the winglet comprises a maximum overhang Wmax that occurs within 50% of a length of the mean camber line from the leading edge, wherein the winglet comprises a leading portion and a trailing portion, wherein the leading portion of the winglet comprises a blend in portion which starts at any position within the range between the leading edge and up to 2% of the length of the mean camber line from the maximum overhang Wmax and which increases the overhang W from zero to the maximum overhang Wmax, and wherein the leading portion of the winglet comprises a blend out portion which extends along the suction surface a distance in the range 5% to 40% of the length of the mean camber line and is located between the maximum overhang Wmax and the trailing portion and which reduces the overhang W from the maximum overhang Wmax to zero.

19. A gas turbine engine, comprising:

a compressor comprising the compressor aerofoil of claim 18.

* * * * *